(12) United States Patent
Hsu et al.

(10) Patent No.: US 8,611,967 B2
(45) Date of Patent: Dec. 17, 2013

(54) METHODS AND APPARATUSES FOR DETERMINING AND DISPLAYING SERVICE CAPABILITIES

(75) Inventors: Liangchi Hsu, San Diego, CA (US); Sitaramanjaneyulu Kanamarlapudi, San Diego, CA (US); Kiran KrishanRao Patil, Hyderabad (IN); Arvindhan Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/286,548

(22) Filed: Nov. 1, 2011

(65) Prior Publication Data

US 2012/0184253 A1    Jul. 19, 2012

Related U.S. Application Data

(60) Provisional application No. 61/433,445, filed on Jan. 17, 2011.

(51) Int. Cl.
*H04M 1/00* (2006.01)

(52) U.S. Cl.
USPC .......................................................... 455/566

(58) Field of Classification Search
USPC .......................................... 455/456.3, 550.1
See application file for complete search history.

(56) References Cited

U.S. PATENT DOCUMENTS

| | | | |
|---|---|---|---|
| 5,613,213 A | 3/1997 | Naddell et al. | |
| 7,640,010 B2 | 12/2009 | Muhonen | |
| 7,831,261 B2* | 11/2010 | Uno et al. | 455/456.3 |
| 2004/0224702 A1* | 11/2004 | Chaskar | 455/456.3 |
| 2006/0116125 A1* | 6/2006 | Buckley et al. | 455/435.1 |
| 2008/0305825 A1 | 12/2008 | Shaheen | |
| 2009/0117882 A1 | 5/2009 | Yamahira | |
| 2009/0131102 A1 | 5/2009 | Takahashi et al. | |
| 2009/0149162 A1 | 6/2009 | Tenny | |
| 2010/0165918 A1 | 7/2010 | Kobayashi | |
| 2010/0316034 A1 | 12/2010 | Burbidge et al. | |

FOREIGN PATENT DOCUMENTS

| | | |
|---|---|---|
| EP | 2077695 A1 | 7/2009 |
| WO | 2010051209 A1 | 5/2010 |

OTHER PUBLICATIONS

International Search Report and Written Opinion—PCT/US2012/021595—ISAEPO—Apr. 27, 2012.

* cited by examiner

*Primary Examiner* — Temica M Beamer
*Assistant Examiner* — Joel Ajayi
(74) *Attorney, Agent, or Firm* — Darren M. Simon

(57) ABSTRACT

Methods and apparatuses are provided for determining features provided by a cell and for indicating a service capability corresponding to the determined features. A user equipment may connect to a cell and determine one or more features provided by the cell. Information relating to the one or more features can be stored in a storage medium. An indicator may be displayed to identify a service capability corresponding to the stored information, as well as a capability of the user equipment.

20 Claims, 7 Drawing Sheets

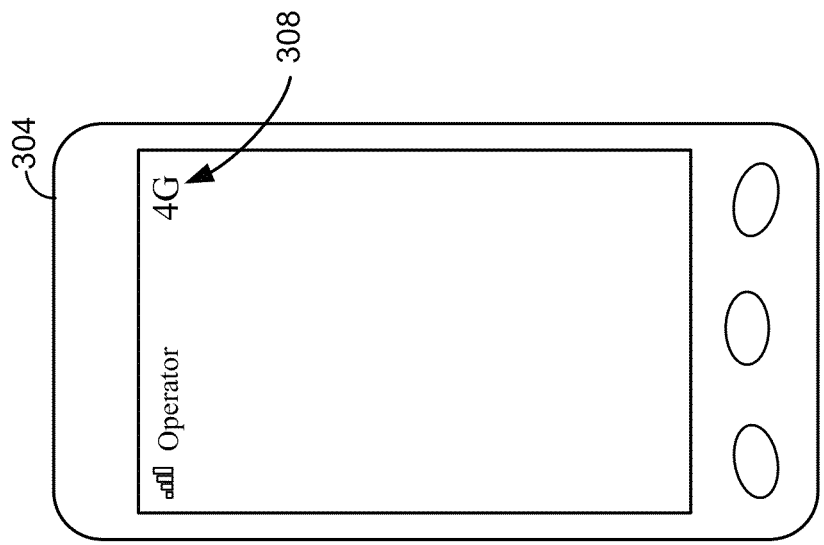
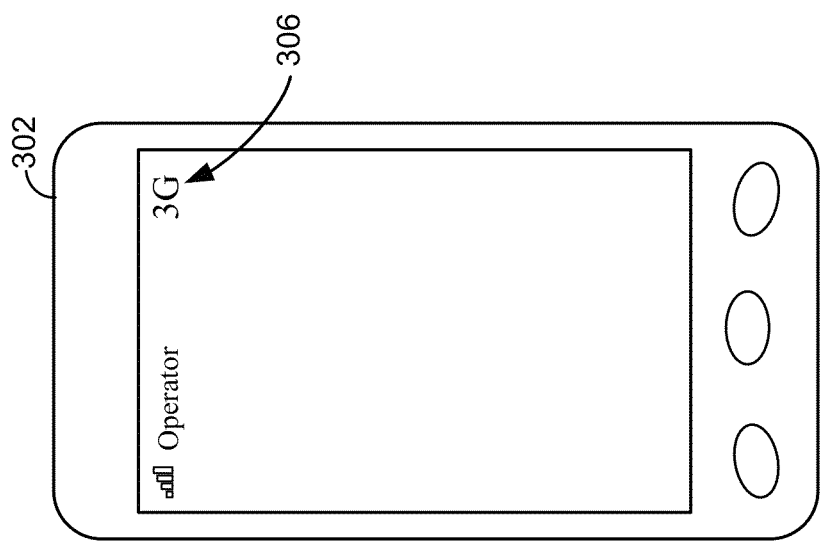
FIG. 3

| Feature Item | Supported by this UE | Supported by this network | Can claim to be 4G service, if available | Can claim to be 4.5G service, if available |
|---|---|---|---|---|
| 3GPP Rel-7 CPC | Yes | Yes | TRUE | FALSE |
| 3GPP Rel-7 Enhanced Cell_FACH | Yes | Yes | TRUE | FALSE |
| 3GPP Rel-7 Enhanced Cell_PCH | Yes | Yes | TRUE | FALSE |
| 3GPP Rel-8 Enhanced HS_RACH | No | Yes | TRUE | FALSE |
| 3GPP Rel-8 Fast Dormancy | Yes | Yes | TRUE | FALSE |
| 3GPP Rel-8 Enhanced Layer 2 | No | Yes | TRUE | FALSE |
| 3GPP Rel-7 64QAM | Yes | Yes | TRUE | FALSE |
| 3GPP Rel-7 MIMO | Yes | Yes | TRUE | FALSE |
| 3GPP Rel-8 DC-HSDPA | No | Yes | TRUE | FALSE |
| 3GPP Rel-8 MIMO+64QAM | No | Yes | TRUE | FALSE |
| 3GPP Rel-9 DC-HSPA+MIMO+64QAM | No | No | TRUE | TRUE |
| ... | ... | ... | ... | ... |
| UE Radio Category | 14 | 18 | HIGHER THAN 14 | HIGHER THAN 24 |

*FIG. 5*

METHODS AND APPARATUSES FOR DETERMINING AND DISPLAYING SERVICE CAPABILITIES

CLAIM OF PRIORITY UNDER 35 U.S.C. §119

The present Application for Patent claims priority to Provisional Application No. 61/433,445 entitled "Scheme and Apparatus for indicating Advanced Feature Supports in UMTS/HSPA+ Wireless Devices of Next Generations" filed Jan. 17, 2011, and is hereby expressly incorporated by reference herein.

BACKGROUND

1. Field

Aspects of the present disclosure relate generally to wireless communication systems, and at least some aspects pertain more particularly to methods and devices for facilitating a determination of service capabilities for a user equipment in a particular cell, and for displaying the service capabilities to a user.

2. Background

Wireless communication networks are widely deployed to provide various communication services such as telephony, video, data, messaging, broadcasts, and so on. Such networks, which are usually multiple access networks, support communications for multiple users by sharing the available network resources. Over time, wireless communication networks have evolved from analog voice-centric networks to digital voice and data networks.

As wireless communication networks have progressed with offering digital voice and data, such networks continue to provide increasing data rates and/or bandwidths to wireless communications. With the increases in data rates and/or bandwidths, wireless communication networks have also increased the capabilities available to users. For example, with the jump from $2^{nd}$ generation (2G) wireless communication networks to $3^{rd}$ generation (3G) wireless communication networks, additional capabilities have been made available to users, such as wide-area wireless voice telephone, mobile Internet access, video calls and mobile TV, all in a mobile environment. With the evolution from 3G networks to $4^{th}$ generation (4G) wireless communication networks, additional capabilities have been made available to users, such as ultra-broadband Internet access, IP telephony, gaming services, and streamed multimedia.

As these technologies have advanced, many user equipments (UEs) are enabled to employ two or more different generations of wireless communication network technologies. As a result, a UE may provide different capabilities to the user based on what technologies are available in a particular geographic location at a particular time. For example, a UE that is adapted to operate using 3G and 4G enabled wireless communication networks may have access to 4G-associated capabilities in one geographic location at a given time during the day, but may have access only to 3G-associated capabilities in another geographic location and/or at a different time of the day.

It would be beneficial to users of such UEs to be made aware of what capabilities are available at any given time and location.

SUMMARY

Methods and apparatuses are provided for determining features provided by a cell and for indicating a service capability corresponding to the determined features.

In at least one aspect, the disclosure provides methods operational on a user equipment. Such methods may include connecting to a cell, determining at least one feature provided by the cell, storing in a storage medium information relating to the at least one feature provided by the cell, and displaying an indicator identifying a service capability corresponding to the stored information and a capability of the user equipment.

One or more other aspects of the disclosure provide apparatuses for wireless communication. Such apparatuses may include a communications interface adapted to facilitate wireless communication, a storage medium, a user interface, and a processing circuit coupled to the communications interface, the storage medium, and the user interface. The processing circuit may be adapted to connect to a cell via the communications interface, determine at least one feature provided by the cell, store in the storage medium information relating to the at least one feature provided by the cell, and display an indicator on the user interface to identify a service capability corresponding to the stored information and a capability of the apparatus.

In yet additional aspects of the disclosure, methods operational on a user equipment may include obtaining a pre-defined list of features potentially provided by cells in an access network, receiving a wireless transmission from a cell, identifying from the wireless transmission at least one feature provided by the cell, wherein the at least one feature is listed on the pre-defined list, storing information relating to the at least one feature, determining a service capability associated with the at least one identified feature, and displaying an indicator identifying the service capability based on the at least one identified feature and a capability of the user equipment.

In still further aspects of the disclosure, apparatuses for wireless communication may include a communications interface adapted to facilitate wireless communication, a storage medium, a user interface, and a processing circuit coupled to the communications interface, the storage medium, and the user interface. The processing circuit may be adapted to obtain a pre-defined list of features potentially provided by cells in an access network, receive a wireless transmission from a cell, identify from the wireless transmission at least one feature provided by the cell, wherein the at least one feature is listed on the pre-defined list, store information relating to the at least one feature, determining a service capability associated with the at least one feature, and display an indicator identifying the service capability based on the at least one feature and a capability of the apparatus.

These and other aspects of the disclosure will become more fully understood upon a review of the detailed description, which follows.

BRIEF DESCRIPTION OF THE DRAWINGS

FIG. 3 is a block diagram illustrating examples of service capability indicators displayed by UEs.

FIG. 5 illustrates an example of a table that may be stored in a UE as the feature list.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
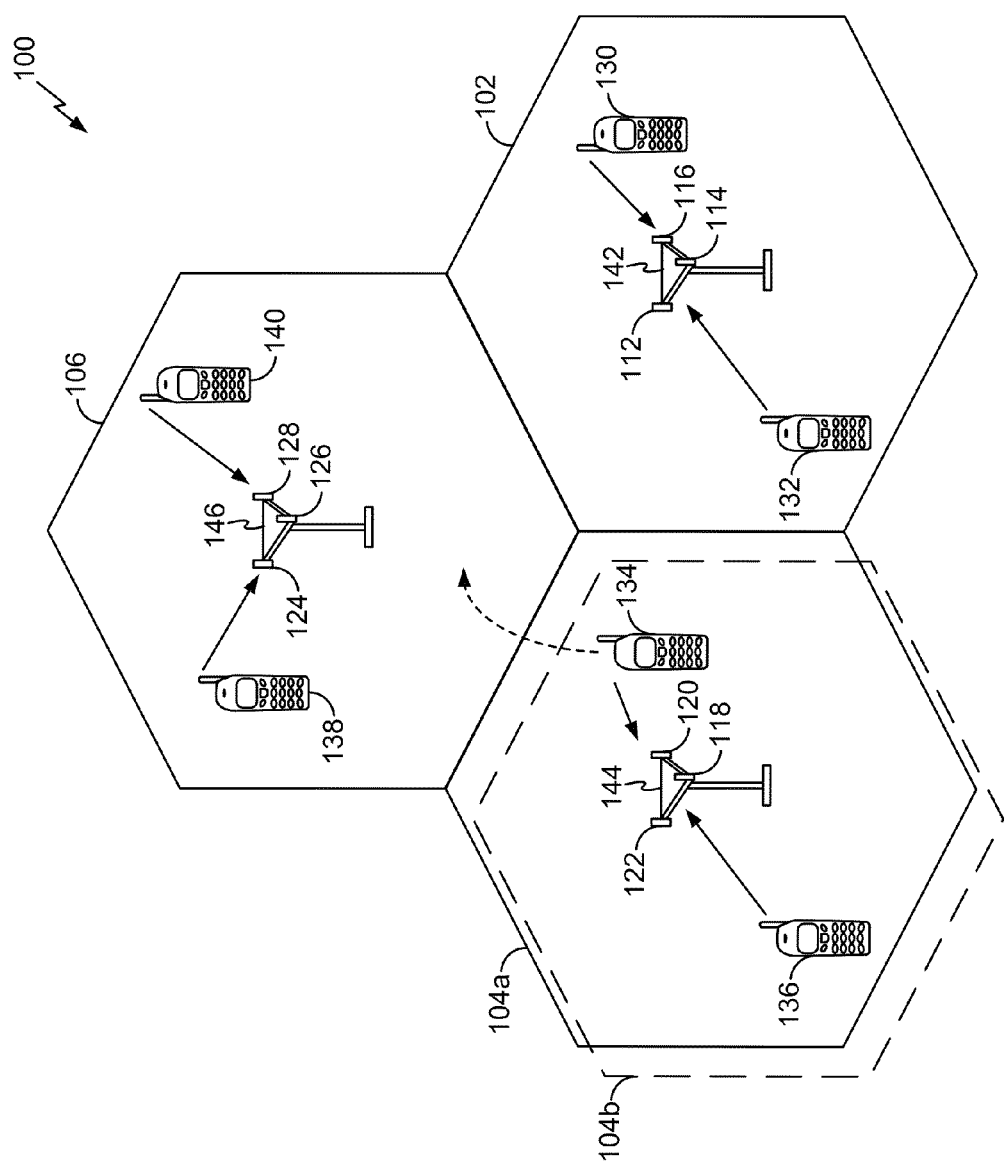
FIG. 1 is a conceptual diagram illustrating an example of an access network.

The various concepts presented throughout this disclosure may be implemented across a broad variety of telecommunication systems, network architectures, and communication standards. Referring to FIG. 1, by way of example and without limitation, a simplified access network 100 is illustrated. The access network 100 includes multiple cellular regions (cells), including cells 102, 104, and 106, each of which may include one or more sectors. Cells may be defined geographically, e.g., by coverage area, and/or may be defined in accordance with a frequency, scrambling code, etc. That is, the illustrated geographically-defined cells 102, 104, and 106 may each be further divided into a plurality of cells, e.g., by utilizing different carrier frequencies or scrambling codes. For example, cell 104a may utilize a first carrier frequency or scrambling code, and cell 104b, while in the same geographic region and served by the same Node B 144, may be distinguished by utilizing a second carrier frequency or scrambling code.

In a cell that is divided into sectors, the multiple sectors within a cell can be formed by groups of antennas with each antenna responsible for communication with one or more mobile devices in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector. The various antenna groups can form part of respective radio transceiver apparatus (or base stations) 142, 144 and 146 respectively serving each cell 102, 104 and 106. Such base stations 142, 144 and 146 may also be referred to by those skilled in the art as a base transceiver stations (BTS), radio base stations, radio transceivers, transceiver functions, basic service sets (BSS), extended service sets (ESS), access points (AP), Node Bs, or some other suitable terminology.

The cells 102, 104 and 106 may include several mobile devices operating therein. Such mobile devices are referred to herein as user equipment (UE), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Examples of a UE include a cellular phone, a smart phone, a session initiation protocol (SIP) phone, a laptop, a notebook, a netbook, a smartbook, a tablet computer, a personal digital assistant (PDA), a satellite radio, a global positioning system (GPS) device, a multimedia device, a video device, a digital audio player (e.g., MP3 player), a camera, a game console, or any other device with a processor that communicates with other devices through wireless signals. The UEs typically include a user identification module, such as a Subscriber Identification Module (SIM) for GSM networks, Universal Subscriber Identification Module (USIM) for UMTS/LTE networks or Removable User Identification Module (RUIM) for CDMA networks, which contain a user's subscription information for a network.

The cells 102, 104 and 106 may include several UEs that may be in communication with one or more sectors of each cell 102, 104 or 106. For example, UEs 130 and 132 may be in communication with a base station 142 of cell 102, UEs 134 and 136 may be in communication with the base station 144 of cell 104, and UEs 138 and 140 may be in communication with the base station 146 of cell 106. The downlink (DL), also called the forward link, refers to the communication link from a base station 142, 144, 146 to a UE 130, 132, 134, 136, 138, 140, and the uplink (UL), also called the reverse link, refers to the communication link from a UE 130, 132, 134, 136, 138, 140 to a base station 142, 144, 146.

Figure 2:
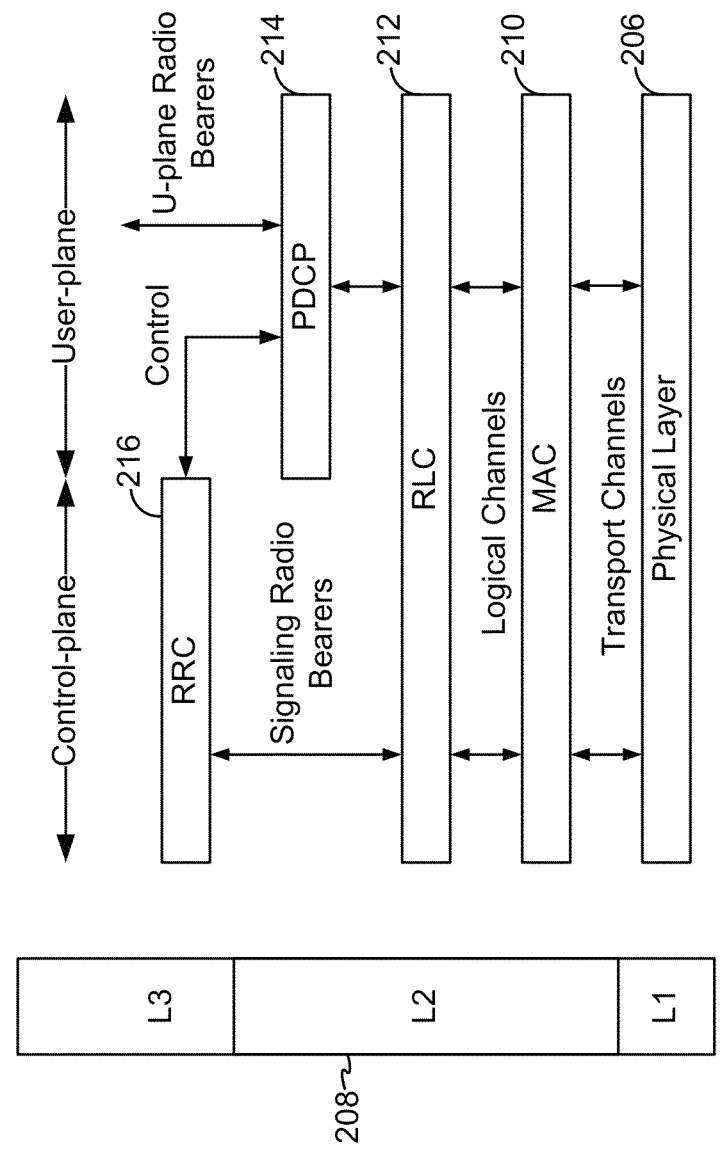
FIG. 2 is a conceptual diagram illustrating an example of a radio protocol architecture for the user and control plane.

FIG. 2 illustrates an example of the radio protocol architecture for a UE (such as UEs 130, 132, 134, 136, 138, 140) and a base station (such as base stations 142, 144, 146) operating in a Universal Mobile Telecommunications System (UMTS) system. The radio protocol architecture is shown with three layers: Layer 1 (L1), Layer 2 (L2), and Layer 3 (L3). Layer 1 is the lowest layer and implements various physical layer signal processing functions. Layer 1 will be referred to herein as the physical layer 206. The data link layer, called Layer 2 (or "the L2 layer") 208 is above the physical layer 206 and is responsible for the link between the UE and base station over the physical layer 206.

At Layer 3, the RRC layer 216 handles the control plane signaling between the UE and the base station. RRC layer 216 includes a number of functional entities for routing higher layer messages, handling broadcast and paging functions, establishing and configuring radio bearers, etc.

In the illustrated air interface, the L2 layer 208 is split into sublayers. In the control plane, the L2 layer 208 includes two sublayers: a medium access control (MAC) sublayer 210 and a radio link control (RLC) sublayer 212. In the user plane, the L2 layer 208 additionally includes a packet data convergence protocol (PDCP) sublayer 214. Although not shown, the UE may have several upper layers above the L2 layer 208 including a network layer (e.g., IP layer) that is terminated at a PDN gateway on the network side, and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between base stations.

The RLC sublayer 212 provides segmentation and reassembly of upper layer data packets, retransmission of lost data packets, and reordering of data packets to compensate for out-of-order reception due to a hybrid automatic repeat request (HARQ).

The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations.

Each cell 102, 104 and 106 may provide various wireless services, including telephony, video, data, messaging, broadcasts, and/or other services. Each cell 102, 104 and 106 also supports various features, within the telecommunication standard, network architecture and/or communication standard implemented by the access network 100. As used herein, a feature refers to specific capabilities within a particular telecommunication standard, network architecture and/or communication standard. For example, in an access network 100 implementing a Universal Mobile Telecommunications System (UMTS) with evolved high speed packet access (HSPA+), examples of features that might be available include dual-carrier uplink or downlink (DC-HSUPA, DC-HSDPA) or greater numbers of carriers, 64-QAM, MIMO, Enhanced Cell-FACH, Enhanced Cell-PCH, Enhanced HS_RACH, Enhanced Layer 2, etc., as well as combinations thereof.

In some instances, at least some of the cells 102, 104, 106 may be adapted to support different features from one or more of the other cells. For example, the UE 134 may have access to features A, B and C while operating within cell 104. However, if the UE 134 subsequently travels to cell 106, the UE 134 may have access to an additional feature D (e.g., A, B, C and D). In other instances, the available features provided by a particular cell can change over time. For example, in the course of a day, one or more of the cells 102, 104, 106 may enable certain features during peak hours, and disable those features when not needed.

As features can change between cells or over time on the same cell, a UE of the present disclosure is generally adapted to determine which features are available in a given cell. As illustrated by the two UEs 302 and 304 in FIG. 3, a UE can further display an indicator 306, 308, which can signify to a user the availability of a particular service capability associated with the available features for the cell to which the UE is connected. For example, a $3^{rd}$ generation (3G) service capability may be defined by the availability of features A, B and C, while a $4^{th}$ generation (4G) service capability may be defined by the availability of features A, B, C and D. According to the various implementations described herein, the UE 302 may be adapted to determine that features A, B and C are available in a particular cell and display an indicator 306 to the user that 3G services are currently available to the user. Similarly, the UE 304 may determine that features A, B, C and D are available in another cell, and the UE 304 can display an indicator 308 to the user that 4G services are currently available to the user.

Figure 4:
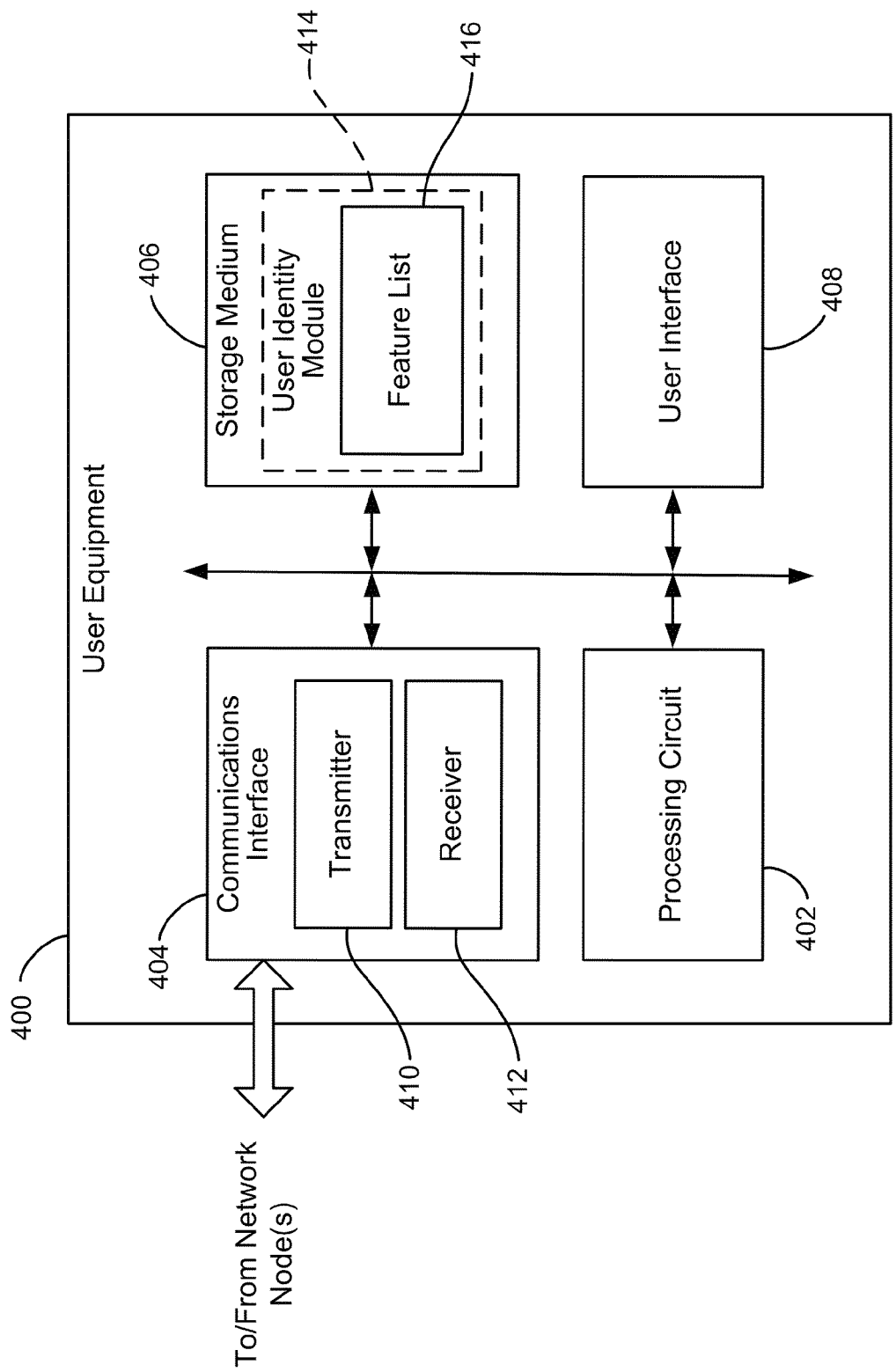
FIG. 4 is a block diagram illustrating an example of a user equipment (UE).

FIG. 4 illustrates a functional block diagram of at least one embodiment of a user equipment (UE) 400. The UE 400 may generally include a processing circuit 402 coupled to a communications interface 404, a storage medium 406, and a user interface 408.

The processing circuit 402 may include one or more processors, microprocessors, controllers, microcontrollers, digital signal processors (DSPs), application specific integrated circuits (ASICs), field programmable gate arrays (FPGAs), programmable logic devices (PLDs), state machines, gated logic, discrete hardware circuits, and/or other programmable logic component, discrete gate or transistor logic, discrete hardware components, or any combination thereof designed to perform the functions described herein. These examples of the processing circuit 402 are for illustration and other suitable configurations within the scope of the present disclosure are also contemplated. The processing circuit 402 is adapted for general processing, including the execution of software, which may be stored on the storage medium 406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 404 is configured to facilitate wireless communications of the UE 400. The communications interface 404 may include at least one transmitter 410 and/or at least one receiver 412 (e.g., one or more transmitter/receiver chains). Furthermore, one or more antennas may be electrically coupled to the communications interface 404.

The storage medium 406 may represent one or more devices for storing programming and/or data, such as processor executable code or instructions (e.g., software, firmware), electronic data, databases, or other digital information. The storage medium 406 may be a non-transitory computer-readable medium such as, by way of example, a magnetic storage device (e.g., hard disk, floppy disk, magnetic strip), an optical storage mediums (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer, as well as any combination thereof. The storage medium 406 may be coupled to, or at least accessible by the processing circuit 402 such that the processing circuit 402 can read information from, and write information to, the storage medium 406. In the alternative, the storage medium 406 may be integral to the processing circuit 402. Optionally, in some embodiments, the storage medium 406, or at least one device of a plurality of devices that include the storage medium 406, may include a user identity module 414 (e.g., SIM, USIM, RUIM).

Software stored by the storage medium 406, when executed by the processing circuit 402, causes the UE 400 to perform the various functions and/or process steps described herein. The storage medium 406 may also be used for storing data that is manipulated by the processing circuit 402 when executing software. Thus, according to one or more aspects of the present disclosure, the processing circuit 402 may be adapted to perform any or all of the processes, functions, steps and/or routines related to any of the UEs described herein. As used herein, the term "adapted" in relation to the processing circuit 402 may refer to the processing circuit 402 being one or more of configured, employed, implemented, or programmed to perform a particular process, function, step and/or routine according to various features described herein.

The storage medium 406 may include a feature list 416 having a pre-defined list of features that are implemented in the UE 400 and/or in the wireless access network on which the UE 400 is intended for use. As illustrated in FIG. 4, the feature list 416 may be stored in the user identity module 414 in some embodiments. In at least one embodiment, the feature list 416 may indicate a plurality of features that are potentially available within one or more cells of the operator's access network, as well a service capability associated with each listed feature. The service capability for each feature may, for example, be defined by the access network operator or by a standards organization. A service capability may refer to a generation of cellular service (e.g., 2G, 3G, 4G). For instance, a network operator may define $3^{rd}$ generation (3G) service capability by the availability of features A, B and C, and $4^{th}$ generation (4G) service capability by the availability of features A, B, C and D.

FIG. 5 illustrates an example of a table 500 that may be stored in the storage medium 406 of the UE 402 as the feature list 416. The first column 502 identifies a plurality of features that may be provided by one or more cells of a network. The second column 504 indicates whether the identified feature is supported by the UE 400. The third column 506 indicates whether the identified feature is supported by the cell to which the UE 400 is currently connected, where such connection can be in an active mode (e.g., RRC connected states) or in an idle mode. The fourth column 508 indicates whether the UE 400 can claim $4^{th}$ generation (4G) service capabilities if the identified feature is supported by both the UE 400 and by the cell to which the UE 400 is connected. The fifth column 510 indicates whether the UE 400 can claim $4^{th}$ generation-plus (4.5G) service capability if the identified feature is supported by both the UE 400 and the cell to which the UE 400 is connected.

The table 500 illustrates various features in the first column 502 that may be available for a UE 400 and an access network that are both adapted for UMTS services. By way of example and not limitation, the illustrated table 500 identifies various features including continuous packet connectivity (CPC) as defined by release 7 of the $3^{rd}$ Generation Partnership Project (3GPP) standard, enhanced Cell_FACH as defined by release 7 of the 3GPP standard, enhanced Cell_PCH as defined by release 7 of the 3GPP standard, enhanced HS_RACH as defined by release 8 of the 3GPP standard, fast dormancy as defined by release 8 of the 3GPP standard, enhanced Layer 2 as defined by release 8 of the 3GPP standard, 64 quadrature amplitude modulation (QAM) as defined by release 7 of the 3GPP standard, multiple-input and multiple-output (MIMO) as defined by release 7 of the 3GPP standard, DC-HSDPA as defined by release 8 of the 3GPP standard, MIMO plus 64 QAM as defined by release 8 of the 3GPP standard, high-speed packet access (HSPA) plus MIMO plus 64 QAM as defined by release 9 of the 3GPP standard, and the UE radio category.

Returning to FIG. 4, the user interface 408 includes a display viewable by a user and adapted to indicate availability of one or more service capabilities. For example, the user interface 408 can be adapted to visually indicate availability of service capabilities, such as $2^{nd}$ generation (2G), $2^{nd}$ generation+ (2.5G), $3^{rd}$ generation (3G), $3^{rd}$ generation+ (3.5G), $4^{th}$ generation (4G), $4^{th}$ generation+ (4.5G), etc. The user interface 408 may also include one or more other conventional interfaces, such as a keypad, speaker, microphone, joystick, etc.

Figure 6:
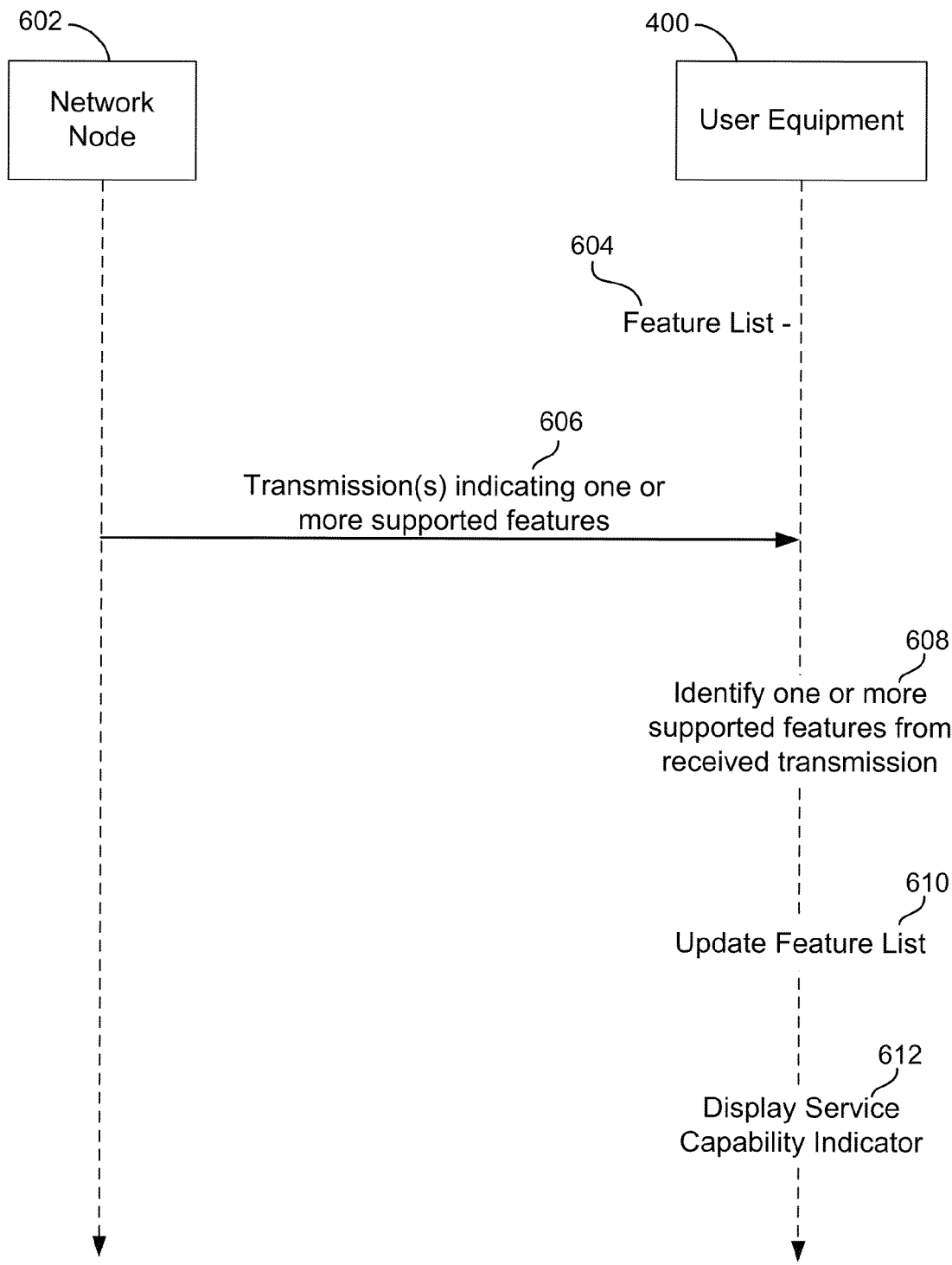
FIG. 6 is a flow diagram illustrating at least one example of a UE interacting with a network node for determining which features are available in a cell.

In operation, the UE 400 generally determines which level of service capability to display based on features determined from one or more received transmissions. For example, FIG. 6 illustrates at least one example of a UE 400 interacting with a network node 602 associated with a cell in order to determine which features are available in the cell. The UE 400, which could be any of the UEs 130, 132, 134, 136, 138, 140 from FIG. 1, is located in a particular cell and communicates with the network node 602, such as a base station 142, 144, 146 from FIG. 1. Initially, a feature list 604 is stored at the UE 400. The feature list 604 may, for example, include a feature list similar to the table 500 in FIG. 5.

The UE 400 receives one or more transmissions 606 from the network node 602, which may indicate one or more features supported by the cell. In some implementations, a received transmission 606 may include a conventional transmission sent for purposes other than expressly identifying features supported by the cell. For example, the received transmission 606 can include one or more conventional system information blocks, or may be part of a radio resource control (RRC) connection establishment procedure or a radio bearer (RB) setup procedure, or any other transmission capable of disclosing one or more features from the feature list. In one or more other implementations, a received transmission 606 can be adapted to explicitly indicate which features are available for the particular cell associated with the network node 602.

On receipt of the one or more transmissions, the UE 400 identifies 608 one or more supported features from the received transmission that are supported by the cell. In the case where the transmissions are intended for purposes other than identifying supported features, the UE 400 can derive the supported features from the information included in the transmission. Once the supported features are identified, the UE 400 can store information relating to the identified features by updating the feature list 610 to indicate that the identified features are supported by the cell. In the case where the transmission is intended to explicitly identify supported features, the UE 400 simply has to process the transmission and update the feature list to save an indication of each identified feature as being supported by the cell.

Finally, the UE 400 displays an indicator 612 to identify a service capability based on the features identified as being available in the cell. In some implementations, the service capability associated with each feature may be defined in the feature list.

Figure 7:
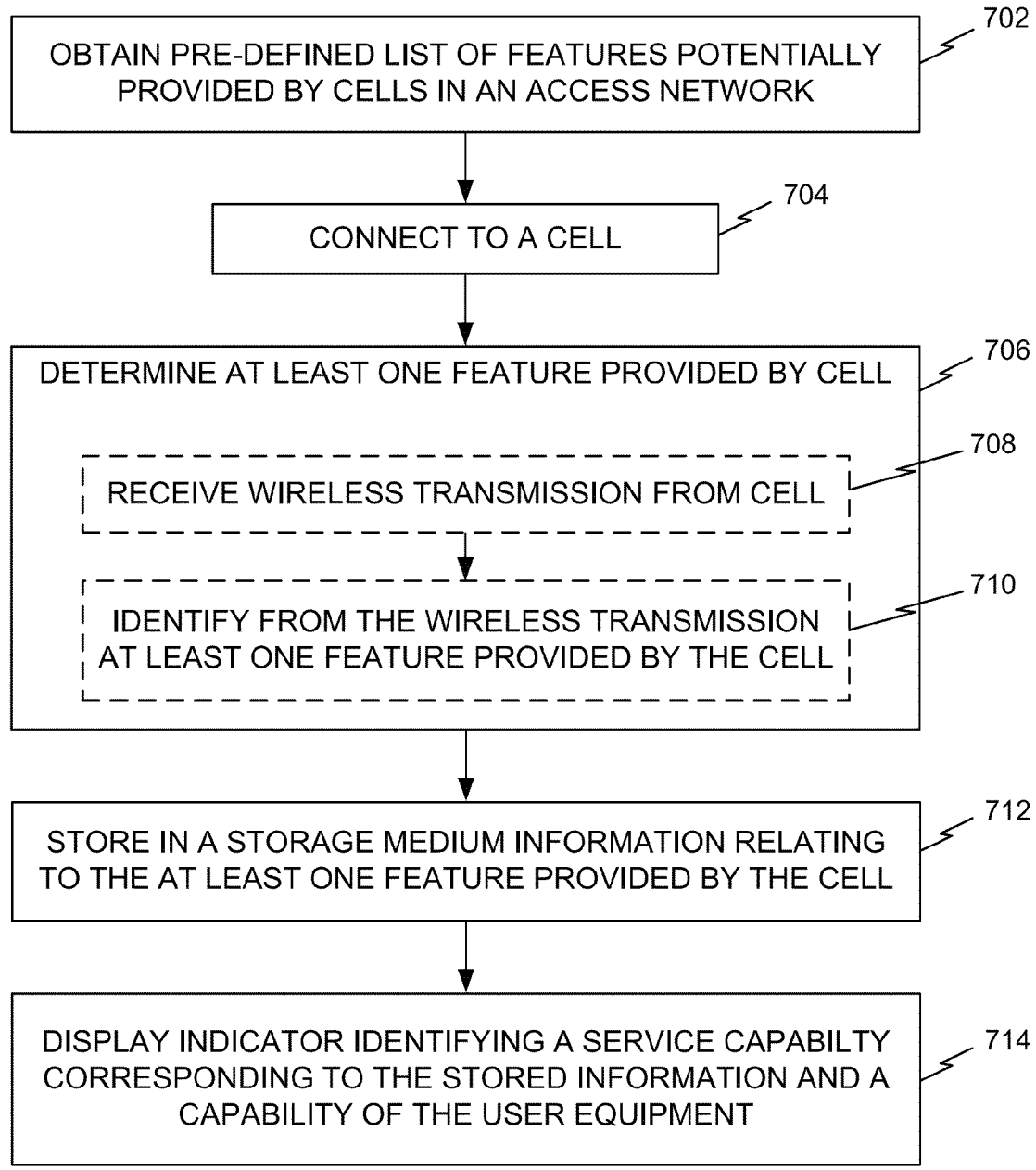
FIG. 7 is a flow diagram illustrating a method operational on a UE for determining and displaying a service capability to a user.

FIG. 7 is a flow diagram illustrating a method operational on a UE, such as UE 400, for determining and displaying a service capability to a user. With reference to FIGS. 4 and 7, a UE 400 may initially obtain a pre-defined feature list 416 identifying features that are potentially provided by one or more cells in an access network, at step 702. For example, the processing circuit 402 may receive and store a feature list 416 in the storage medium 406. In some embodiments, the feature list 416 may be provisioned in the storage medium 406, or provided to the UE 400 as part of the user identity module 414. The feature list 416 includes a list of potential features, and may also indicate a service capability associated with each listed feature.

At step 704, the UE 400 may connect to a cell. For example, the processing circuit 402 may connect to a cell by simply communicating with a network node (e.g., a base station) via the communications interface 404. According to various implementations, the UE 400 may connect to the cell in one of an active mode (e.g., a radio resource control (RRC) connected mode) or an idle mode.

At step 706, the UE 400 determines one or more features provided by the cell. In at least some implementations, the UE 400 may make such a determination by receiving one or more wireless transmissions from the cell, as shown by step 708, and then identifying from the one or more wireless transmissions at least one feature that is provided by the cell, as shown by step 710. According to at least some implementations, the processing circuit 402 may receive via the communications interface 404 one or more conventional transmissions, such as system information blocks intended for other purposes. On receipt of such a transmission, the processing circuit 402 can derive the availability of certain features.

By way of an example and not limitation, in a UMTS architecture, the processing circuit 402 may receive via the communications interface 404 various system information blocks (SIBs), such as system information block type 5 (SIB5), type 5bis (SIB5bis), or type 6 (SIB6), which are conventional transmissions received from a network node. In general, SIB5 and SIB5bis contain parameters for the configuration of the common physical channels in the cell, while SIB6 contains parameters for the configuration of the common and shared physical channels to be used in the connected mode. Although these transmissions do not include an explicit identification of features supported by the cell, the processing circuit 402 can derive the availability of certain features from these transmissions. For example, SIB5, SIB5bis and SIB 6 carry the supporting information for enhanced Cell_FACH and enhanced Cell_PCH as defined by release 7 of the 3GPP standard, as well as enhanced HS_RACH as defined by release 8 of the 3GPP standard. Accordingly, the processing circuit 402 can determine from these transmissions, whether one or more of these features are supported by the cell.

In some instances where the UE 400 is connected to the cell in an idle mode of a UMTS architecture, the processing circuit 402 may continue to receive conventional system information blocks (SIBs), as described above, as well as other transmissions from which support for additional features may be derived. For example, the processing circuit 402 operating in an idle mode may conduct a radio resource control (RRC) connection establishment to perform a UTRAN Registration Area (URA) update procedure and/or a location area update procedure. While performing the RRC establishment procedure, the processing circuit 402 can derive network feature availability from RRC messages sent from the network node associated with the cell. For instance, the processing circuit 402 can derive the availability of continuous packet connectivity (CPC) (DTX, DRX, HS-SCCH-less features) as defined by release 7 of 3GPP standard from such an RRC connection setup message.

In other instances, the UE 400 may be connected to the cell in an active mode. When the UE 400 is connected to the cell in an active mode, additional features may be derived from the various transmissions associated with the active mode. For example, in a UMTS architecture, the UE 400 may be operating in a RRC connected mode as the UE 400 has been or is making a packet data call. In such an example, the processing circuit 402 may conduct a radio bearer (RB) setup procedure or a relevant reconfiguration procedure with the serving cell. As a result of making a call and performing a RB setup or reconfiguration procedures, the processing circuit 402 can derive network feature availability information such as support for MIMO or 64 QAM as defined by release 7 of the 3GPP standard. In addition, the UE radio category information, as well as the maximum possible UE radio category that the network supports can be derived by the processing circuit 402 from a RB setup procedure.

Although the foregoing examples illustrate instances in which a UE 400 can derive feature information from conventional transmissions, other implementations may employ transmissions adapted to explicitly identify one or more features supported by the cell. For example, a system information block (SIB) may be received from a network node associated with the cell, where the system information block (SIB) is adapted to indicate one or more features provided by the cell. In such a case, when determining the at least one feature provided by the cell in step 706, the processing circuit 402 would not necessarily derive the features provided by the cell, but would instead simply process the received transmission to determine which features are provided by the cell.

When the UE 400 has determined one or more features provided by the cell, information relating to the one or more features can be stored in a storage medium at step 712. For example, the processing circuit 402 can store information relating to the at least one feature in the storage medium 406. In at least some implementations where the UE 400 has the feature list 416 stored in the storage medium 406, the processing circuit 402 may store the information relating to the at least one feature by updating the feature list 416 to reflect the availability of the identified feature from the cell. For instance, the processing circuit 402 can update column 506 of the table 500 in FIG. 5 to indicate that a particular feature listed in column 502 is supported by the cell to which the UE 400 is connected. In those implementations where the UE 400 derives the available features via conventional signaling, the UE 400 can store each feature for the cell as they are derived from receipt of various transmissions to create a record of each of the various supported features for a particular cell. In at least some implementations, the UE 400 may also store such information for a plurality of cells as the UE 400 travels between cells in an access network.

At step 714, the UE 400 can display an indicator identifying a service capability corresponding to the stored information and a capability of the UE 400. For example, the processing circuit 402 may display the service capability via the user interface 408. In at least some implementations, the processing circuit 402 may first determine the service capability associated with the at least one feature provided by the cell. For example, the feature list 416 may designate the service capability associated with each feature listed. Such designations may be made by the network operator or by a standards organization. As shown in FIG. 5, the columns 508 and 510 indicate whether each listed feature is designated as a 4G service capability or a 4.5G service capability. In such implementations, the processing circuit 402 can determine whether the feature determined to be provided by the cell is also supported by the UE 400 (see column 504 in FIG. 5), and can then determine which service capability to display when a feature is supported by both the UE 400 and the cell. The processing circuit 402 may then cause the user interface 408 to display the determine service capability, such as a 4G or 4.5G.

By displaying to the user the service capability currently supported by both the UE 400 and the cell to which the UE 400 is connected, the user is better able to choose between services. For example, a user seeing that 3G or 3.5G service capabilities are available (i.e., supported by the current cell and by the UE 400), the user may choose to text chat instead of video chat. On the other hand, on seeing that 4G or 4.5G service capabilities are available, the user may choose to video chat instead of just text chat. In addition, network operators can employ such a flexible way to display availability of advanced features for marketing and branding purposes.

Several aspects of a telecommunications system have been presented with examples of a UMTS system. As those skilled in the art will readily appreciate, various aspects described throughout this disclosure may be extended to other telecommunication systems, network architectures and communication standards.

By way of example, various aspects may apply to any of the various UMTS systems, such as W-CDMA, TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method operational on a user equipment, comprising:
   obtaining a pre-defined list of features, wherein the pre-defined list of features comprises a list of potential features provided by cells in an access network and service capability information associated with each listed potential feature;
   connecting to a cell in the access network subsequent to obtaining the predefined list of features;
   receiving a wireless transmission from the cell;
   determining at least one feature provided by the cell based in part on information included in the wireless transmission, wherein the at least one feature provided by the cell is derived from the information provided in the wireless transmission;
   storing in a storage medium information relating to the at least one feature provided by the cell; and
   displaying an indicator identifying a service capability corresponding to the stored information and a capability of the user equipment, wherein displaying the indicator identifying the service capability corresponding to the stored information and the capability of the user equipment comprises:
      determining the service capability associated with the at least one feature;
      determining that the user equipment is capable of utilizing the at least one feature; and
      displaying the indicator when the user equipment is capable of utilizing the at least one feature.

2. The method of claim 1, wherein connecting to the cell comprises:
   connecting to the cell in one of an active mode or an idle mode.

3. The method of claim 1, wherein receiving the wireless transmission from the cell comprises at least one of:
   receiving a system information block from the cell;
   conducting a radio resource control (RRC) connection setup procedure with the cell; or
   performing a radio bearer (RB) setup procedure.

4. The method of claim 1, wherein receiving the wireless transmission from the cell comprises:
   receiving a wireless communication explicitly identifying the at least one feature as being provided by the cell.

5. The method of claim 1, wherein storing in the storage medium the information relating to the features provided by the cell comprises:
   updating the pre-defined list of features stored in the storage medium to indicate that the at least one feature is provided by the cell.

6. The method of claim 1, wherein storing in the storage medium the information relating to the features provided by the cell comprises:
   storing in a user identity module the information relating to the features provided by the cell.

7. The method of claim 1, wherein displaying the indicator identifying the service capability corresponding to the stored information and the capability of the user equipment comprises:
   displaying the indicator identifying a network generation determined to be associated with the stored information.

8. An apparatus for wireless communication, comprising:
   a communications interface adapted to facilitate wireless communication;
   a storage medium;
   a user interface; and
   a processing circuit coupled to the communications interface, the storage medium, and the user interface, the processing circuit adapted to:
      obtain a pre-defined list of features, wherein the pre-defined list of features comprises a list of potential features provided by cells in an access network and service ca ability information associated with each listed potential feature;
      connect to a cell in the access network via the communications interface subsequent to obtaining the pre-defined list of features;
      receive a wireless transmission from the cell;
      determine at least one feature provided by the cell based in part on information included in the wireless transmission, wherein the at least one feature provided by the cell is derived from the information provided in the wireless transmission;
      store in the storage medium information relating to the at least one feature provided by the cell; and
      display an indicator on the user interface to identify a service capability corresponding to the stored information and a capability of the apparatus, wherein the processing circuit adapted to display the indicator on the user interface to identify a service capability corresponding to the stored information and a capability of the apparatus comprises the processing circuit adapted to:
         determine the service capability associated with the at least one feature;
         determine that the apparatus is capable of utilizing the at least one feature; and
         display the indicator when the apparatus is capable of utilizing the at least one feature.

9. The apparatus of claim 8, wherein the processing circuit is adapted to connect to the cell in one of an active mode or an idle mode.

10. The apparatus of claim 8, wherein the received transmission comprises at least one of a system information block, a transmission associated with a radio resource control (RRC) connection setup procedure, or a transmission associated with a radio bearer (RB) setup procedure.

11. The apparatus of claim 8, wherein the received transmission comprises an explicit indication of the at least one feature provided by the cell.

12. The apparatus of claim 8, wherein the information relating to the at least one feature provided by the cell is stored by updating the pre-defined list of features stored in the storage medium.

13. The apparatus of claim 8, wherein the storage medium comprises a user identity module.

14. The apparatus of claim 8, wherein the displayed indicator comprises a network generation determined to be associated with the stored information.

15. An apparatus for wireless communication, comprising:
means for obtaining a pre-defined list of features, wherein the predefined list of features comprises a list of potential features provided by cells in an access network and service capability information associated with each listed potential feature;
means for connecting to a cell in the access network subsequent to obtaining the predefined list of features;
means for receiving a wireless transmission from the cell;
means for determining at least one feature provided by the cell based in part on information included in the wireless transmission, wherein the at least one feature provided by the cell is derived from the information provided in the wireless transmission;
means for storing in a storage medium information relating to the at least one feature provided by the cell; and
means for displaying an indicator identifying a service capability corresponding to the stored information and a capability of the apparatus, wherein the means for displaying the indicator identifying the service capability corresponding to the stored information and the capability of the user equipment comprises:
means for determining the service capability associated with the at least one feature;
means for determining that the user equipment is capable of utilizing the at least one feature; and
means for displaying the indicator when the user equipment is capable of utilizing the at least one feature.

16. The apparatus of claim 15, wherein the means for receiving the wireless transmission further comprises at least one of:
means for receiving a system information block from the cell;
means for conducting a radio resource control (RRC) connection setup procedure with the cell; or
means for performing a radio bearer (RB) setup procedure.

17. The apparatus of claim 15, wherein the means for storing in the storage medium further comprises:
means for updating the pre-defined list of features stored in the storage medium to indicate that the at least one feature is provided by the cell.

18. A computer program product for wireless communication, comprising: a non-transitory computer readable medium, comprising:
at least one instruction executable by a computer to obtain a pre-defined list of features, wherein the predefined list of features comprises a list of potential features provided by cells in an access network and service capability information associated with each listed potential feature;
at least one instruction executable by the computer to connect to a cell in the access network subsequent to obtaining the predefined list of features;
at least one instruction executable by the computer to receive a wireless transmission from the cell;
at least one instruction executable by the computer to determine at least one feature provided by the cell based in part on information included in the wireless transmission, wherein the at least one feature provided by the cell is derived from the information provided in the wireless transmission;
at least one instruction executable by the computer to store in a storage medium information relating to the at least one feature provided by the cell; and
at least one instruction executable by the computer to display an indicator identifying a service capability corresponding to the stored information and a capability of the apparatus, wherein the at least one instruction executable by the computer to display the indicator identifying the service capability corresponding to the stored information and the capability of the user equipment comprises:
at least one instruction executable by the computer to determine the service capability associated with the at least one feature;
at least one instruction executable by the computer to determine that the user equipment is capable of utilizing the at least one feature; and
at least one instruction executable by the computer to display the indicator when the user equipment is capable of utilizing the at least one feature.

19. The computer program product of claim 18, wherein the at least one instruction executable by the computer to receive the wireless transmission further comprises at least one of:
at least one instruction executable by the computer to receive a system information block from the cell;
at least one instruction executable by the computer to conduct a radio resource control (RRC) connection setup procedure with the cell; or
at least one instruction executable by the computer to perform a radio bearer (RB) setup procedure.

20. The apparatus of claim 18, wherein the at least one instruction executable by the computer to store in the storage medium further comprises:
at least one instruction executable by the computer to update the pre-defined list of features stored in the storage medium to indicate that the at least one feature is provided by the cell.

* * * * *